United States Patent [19]

Seger

[11] 4,221,037
[45] Sep. 9, 1980

[54] METHOD FOR MANUFACTURING A FLUID CONTROL DEVICE WITH DISC-TYPE FLOW RESTRICTOR

[75] Inventor: Fritz O. Seger, Fairview, Pa.

[73] Assignee: Copes-Vulcan, Inc., Lake City, Pa.

[21] Appl. No.: 837,871

[22] Filed: Sep. 29, 1977

Related U.S. Application Data

[63] Continuation of Ser. No. 641,544, Dec. 17, 1975, abandoned, which is a continuation-in-part of Ser. No. 415,828, Nov. 14, 1973, abandoned.

[51] Int. Cl.² .......................... B23P 15/00; F15D 1/00
[52] U.S. Cl. .................................. 29/157.1 R; 138/42; 251/127
[58] Field of Search .................. 29/157.1 R, DIG. 26; 82/2 A, 2 R; 138/43, 42, 40, 46; 137/625.28, 625.3; 251/127

[56] References Cited

U.S. PATENT DOCUMENTS

| | | | |
|---|---|---|---|
| 1,382,941 | 6/1921 | Steenstrup | 29/157 R |
| 2,631,612 | 3/1953 | Buescher | 251/127 |
| 2,731,253 | 1/1956 | Spencer | 138/43 |
| 3,027,632 | 4/1962 | Baynes et al. | 29/DIG. 26 |
| 3,188,724 | 6/1965 | Bates et al. | 29/157.1 R |
| 3,514,074 | 5/1970 | Self | 138/42 |
| 3,688,800 | 9/1972 | Hayner et al. | 138/42 |
| 3,894,716 | 7/1975 | Barb | 138/42 |
| 3,917,221 | 11/1975 | Kubota et al. | 138/42 |
| 3,917,222 | 11/1975 | Kay et al. | 138/42 |
| 4,050,476 | 9/1977 | Hayner et al. | 138/42 |

FOREIGN PATENT DOCUMENTS

| | | | |
|---|---|---|---|
| 1008977 | 11/1957 | Fed. Rep. of Germany | 138/42 |
| 3230 | 5/1973 | Italy | 138/42 |

OTHER PUBLICATIONS

Horner, Joseph, *Engineers' Turning*, 11th Edition, Crosby Lockwood & Son, London, 1905, pp. 125–139.

*Primary Examiner*—Daniel C. Crane
*Attorney, Agent, or Firm*—Mandeville and Schweitzer

[57] ABSTRACT

The dislosure relates to fluid flow control devices, particularly for use in connection with valves used in the control of fluids under high pressure. In the new structure, the valve trim includes a novel and advantageous form of flow restrictor, which serves to limit flow velocity and which causes the fluid pressure to be reduced in a sufficient number of discrete stages to minimize noise and cavitation. The new flow restrictor comprises an axial stack of annular discs, each provided with a plurality of annular baffle ribs projecting from its opposite end faces. The annular baffle ribs on one side of the disc are slotted along a number of equally spaced radii, and the ribs on the opposite side of a disc are similarly slotted, but along radii offset from the first set of radii. When a series of these discs is assembled in a stack, downwardly facing ribs of one disc fit between upwardly facing ribs of a disc next below, providing a series of annular passages interconnected by radial slots. Each series of slots is offset and located between the next series and the preceding series, so that the fluid flow is continually divided and recombined for velocity reduction. In addition, the effective area of the radial slots is less than the area of the annular pasages, such that the fluid is passed successively through a series of restricted orifices and expansion areas in passing through the valve. While many of the basic, underlying principles of the restrictor are known, the specific construction of the restrictor element has important advantages over the known prior art, in that a highly desirable form of restrictor assembly is possible with a relatively minimum manufacturing cost.

4 Claims, 10 Drawing Figures

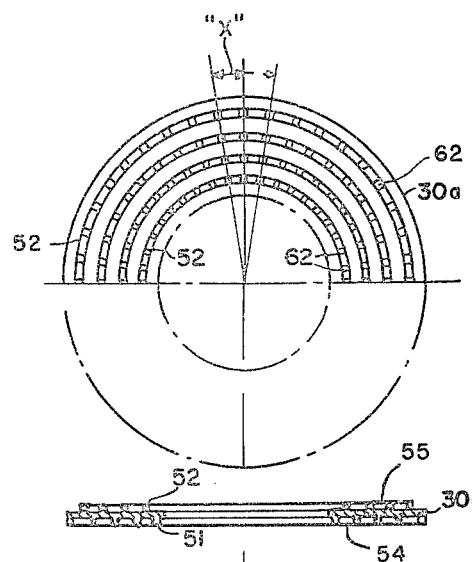
FIG. 3.
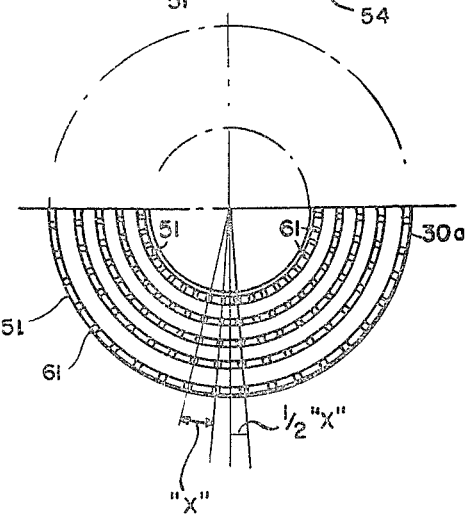
FIG. 2.
FIG. 4.
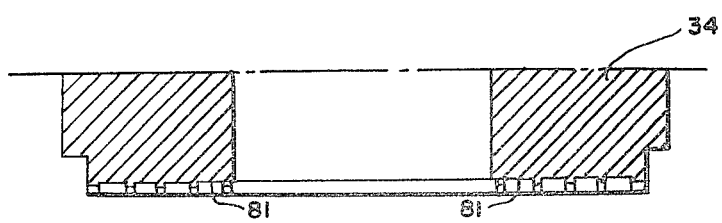
FIG. 6.
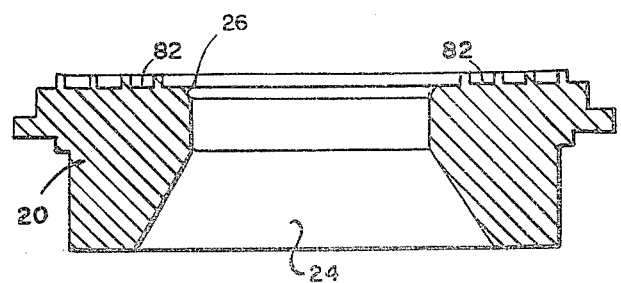
FIG. 7.

METHOD FOR MANUFACTURING A FLUID CONTROL DEVICE WITH DISC-TYPE FLOW RESTRICTOR

RELATED APPLICATIONS

This is a continuation of application Ser. No. 641,544, filed Dec. 17, 1975, now abandoned, which in turn is a continuation-in-part of app. Ser. No. 415,828 filed 11/14/73, now abandoned.

BACKGROUND OF THE INVENTION

In the handling of fluids, either liquids or gases, under high pressure, conventional valves or other throttling devices are subject to severe cavitation and noise problems. Accordingly, many prior art devices have been suggested for the use of flow restrictor means effecting energy dissipation in conjunction with fluid throttling. Among the primary basic proposals for this purpose are the utilization of means to cause the fluid to flow through serpentine or labyrinthine paths, resulting in the dissipation of energy either through friction or through multiple changes of direction, or typically a combination of both. In conjunction with fluid flow control valves, the energy dissipation means usually is incorporated in the valve trim. One of the more advantageous techniques for accomplishing this is to surround the valve plug with a stack of annular discs, forming a cylinder. The make up of the discs is such that, either individually, or in combination with the other discs of the stack, they form the desired restrictive and/or tortuous passages. Representative of such constructions are the following U.S. Pat. Nos. Self 3,513,864, Self 3,514,074, Cummins 3,529,628, Hayner 3,688,800, Burg 3,780,767, Scull 3,856,049, Barb 3,894,716. Similar arrangements have been proposed for service primarily as flow path restrictions, without reference to valving, and representative of such arrangements is the Willmann U.S. Pat. No. 973,328.

SUMMARY OF THE INVENTION

In accordance with the present invention, a novel and improved fluid control valve is provided, including a stacked disc-type of fluid flow restrictor as part of the valve trim assembly, in which the stacked disc restrictor incorporates significant improvements over the stacked disc arrangements known in the prior art. In this respect, the stacked disc restrictor assembly of the present invention includes a substantial plurality of solid disc-like elements which are machined to provide a series of annular ribs and recesses on their principal faces, and a series of radially aligned slots in the annular ribs. The alignment of the slots on opposite sides of the respective discs, is such that, when the discs are assembled in stacks, the radially aligned sets of slots are interrupted by the interposition of a rib from an adjacent disc such that, as fluid progresses generally radially through the restrictor stack, it is diverted at each stage and caused to flow circumferentially in an annular groove to reach a further stage of radial slots. This general flow path configuration, in itself known to have general desirability, is achieved in the present invention in a novel manner which accommodates relatively simple and inexpensive machining operations, specifically turning operations to form the grooves and ribs and simple radial slotting operations to form the desired radial passages. By way of contrast, the arrangement of the Hayner U.S. Pat. No. 3,688,800, for example, while seeking to achieve a somewhat similar configuration of flow paths through the restrictor, suggests chemical etching of the restrictor plates to achieve that. With the novel configuration of individual discs or plates according to the present invention, conventional machining operations may be utilized to achieve the desired results.

According to a further and more specific feature of the invention, the configuration of the respective discs or plates forming the restrictor assembly is such that the upwardly facing ribs of one disc are received centrally within the space or groove between a pair of adjacent, downwardly facing ribs of the adjacent disc next above. The ribs are received substantially to full depth within the grooves of adjacent discs, forming annular passages therein, with adjacent annular passages being connected by radial slots through the ribs. The radial slots are spaced and located, as above mentioned, such that the fluid flow streams are continual and repetitively divided and diverted in passing through the restrictor and, to particular advantage, the passage area formed by the radial slots is significantly less than the annular passage area formed by adjacent ribs of the assembly. Accordingly, in traveling successively through a short length of annular passage, then through a radial slot, and then again through a short length of annular passage, etc., the fluid is repetitively passed through a restricted orifice (the radial slot) and then directed into an expansion chamber (the annular passage). This serves to effect a highly efficient absorption of energy from the high pressure fluid, with a minimum of noise and cavitation.

For a better understanding of the above and other features and advantages of the invention, reference should be made to the following detailed description and to the accompanying drawings.

DESCRIPTION OF THE DRAWINGS

FIG. 2 is a cross sectional view of an annular disc or plate forming part of the restrictor assembly incorporated in the valve of FIG. 1.

FIGS. 3 and 4 are top plan and bottom plan views respectively of the disc of FIG. 2.

FIGS. 6 and 7 are cross sectional views of the uppermost and lowermost elements respectively of the stacked disc assembly incorporated in the valve structure of FIG. 1.

DESCRIPTION OF A PREFERRED EMBODIMENT OF THE INVENTION

Figure 1:
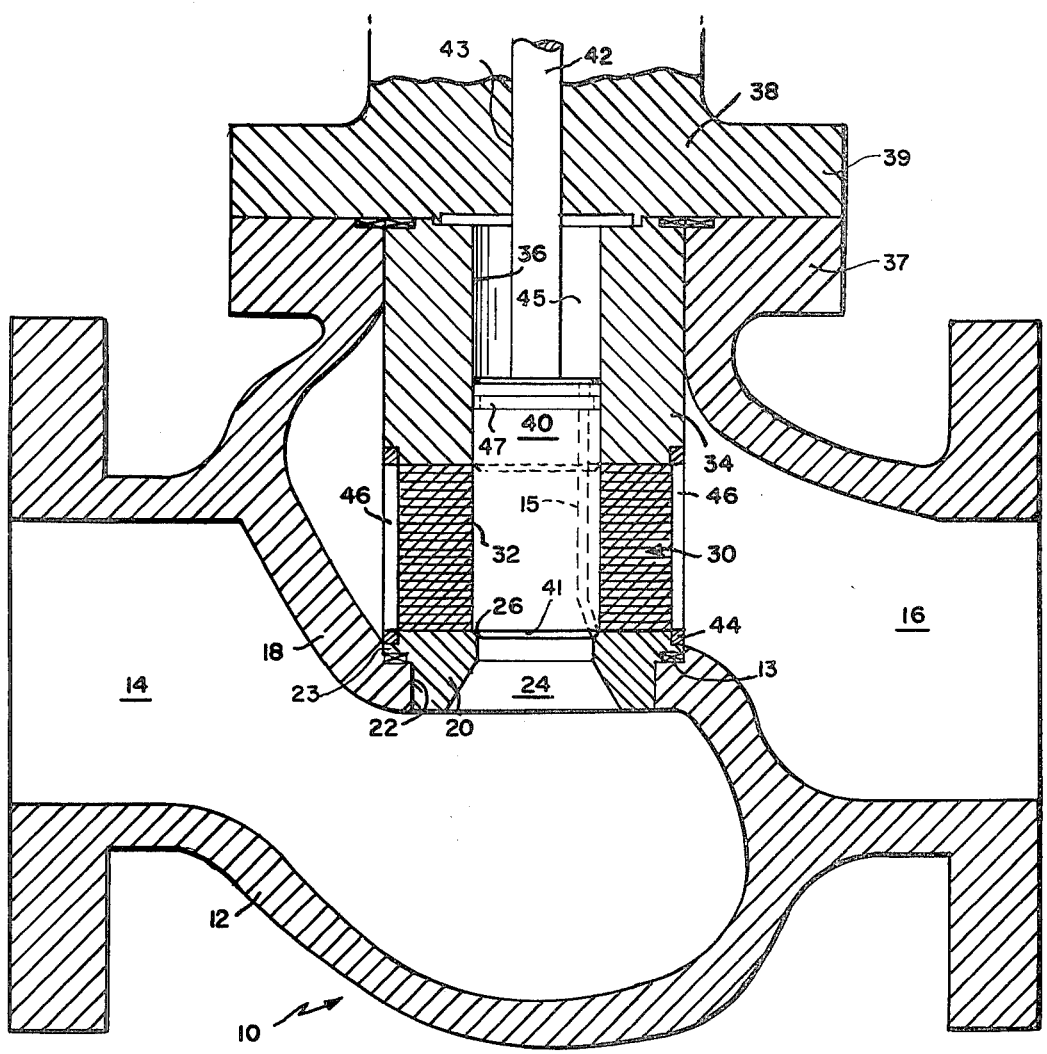
FIG. 1 is a longitudinal cross sectional view of a typical high pressure control valve incorporating the energy dissipating trim assembly according to the invention.

Referring now to the drawings, and initially to FIG. 1, there is illustrated a typical high pressure fluid control valve 10, comprising a valve body 12 provided with an outlet chamber 14 and an inlet chamber 16 separated by a web 18. In the illustrated arrangement, the web 18 is provided with a vertical bore 22 for the reception of a shouldered, annular seat ring 20. The seat ring 20 is securely held in place in the web opening 22, and is provided with a suitable annular seal 13 in the area of its shoulder 23. The seat ring 20 is provided with a central fluid passage 24, and its upper rim is bevelled outward to provide an angled valve seat 26.

Positioned above the seat ring 20 is a cylindrical stack 30 of annular discs, to be described in greater detail, over which is positioned a balancing cylinder 34. The upper portion of the valve body 12 is provided with a flange 37, to which is bolted or otherwise secured the flange 39 of a valve bonnet 38. The valve bonnet engages and secures in position the entire assembly of seat ring 20, disc stack 30 and balancing cylinder 34. Where desired, it may be appropriate to provide a cylindrical retainer cage 44, which surrounds the disc stack 30 and is seated in recesses in the seat ring 20 and balancing cylinder 34. The retainer cage 44 is of substantially open construction, being provided with a plurality of vertical slots or openings 46 to accommodate the relatively unrestricted flow of fluid to and from the stack.

In the illustrated embodiment of the invention, the disc stack 30 and balancing cylinder 34 are provided with aligned cylindrical bores 32, 36, which closely and slideably receive a cylindrical valve plug 40. The valve plug 40 is connected to an operating rod or stem 42, which projects through a bore 43 in the valve bonnet and is connected to an appropriate automatic or manual actuating mechanism (not shown). The valve plug has a tapered, annular surface 41 at its lower end, which seats against the seat ring valve surface 46, when the plug is in its lowermost or closed position. Typically, when the valve is closed the upper chamber 45 of the balancing cylinder is in communication with the high pressure or inlet side of the valve by reason of minor leakage past the seal 47. At such times, the high pressure prevailing in the chamber 45 serves to keep the valve closed. As soon as the valve is opened slightly, a relief port 15 provides communication between the chamber 45 and the outlet side of the valve to release the unbalanced high pressure fluid from the chamber. Where the valve is to be used for high pressure service, and/or where the valve plug is of relatively large diameter, it may be advantageous to provide a pilot arrangement for initially relieving back pressure on the valve plug. In this connection, reference may be made to the Schnall U.S. Pat. No. 3,575,213.

Referring now to FIGS. 2-5, there are shown details of construction of the individual discs 30a which make up the cylindrical restrictor stack 30 forming the valve trim. Each of the discs 30a is formed of a metal suitable for the environment.

Typically, this might be 410 stainless steel although the specific material of construction is not critical to the invention. A typical disc plate, for a "six inch" valve may have an overall diameter of close to seven and one half inches, and an internal diameter close to four and one half inches, it being understood that the dimensions herein given are typical for a given size of valve and would be adjusted appropriately for larger or smaller valves. For a six inch valve, the initial plate thickness typically may be on the order 0.175 inch which, after machining to form axially projecting annular ribs, retains a basic web thickness of around 0.050 inch. As reflected in FIG. 2, the bottom face of the disc 30a is machined to provide a series of spaced annular ribs 51. These ribs are spaced appropriately along the central disc web 53, forming between them a series of annular recesses 54. In a similar manner, the upper face of the disc 30a is provided with a series of radially spaced, upwardly projecting annular ribs 52, forming between them a series of upwardly facing annular grooves 55. As clearly reflected in FIG. 2, the upwardly projecting ribs 52 are located intermediate, and approximately equally spaced from, the downwardly projecting ribs 51. The precise spacing of annular ribs may be varied to suit the conditions of service, so as to contribute to the avoidance of sufficiently large pressure drops at any stage to cause cavitation.

Figure 5:
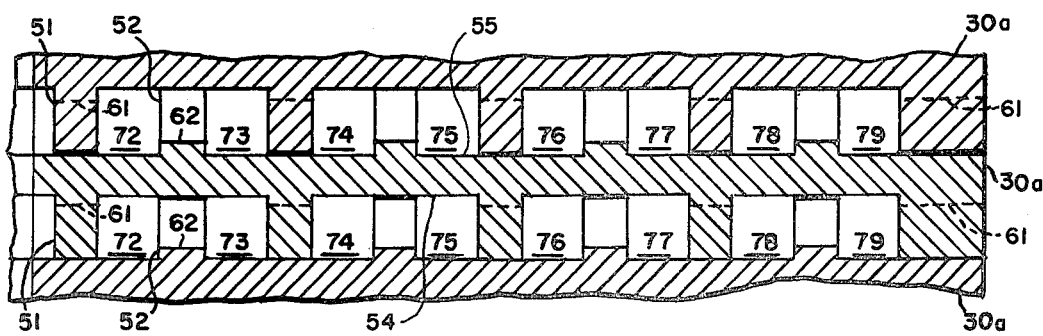
FIG. 5 is an enlarged parital cross-sectional view of the energy dissipating trim assembly of the present invention incorporated in the valve of FIG. 1.

Pursuant to the invention, the radial width of the annular grooves 54, 55 is significantly greater than the width of the ribs 51, 52 defining them. Accordingly, when a pair of discs 30a is arranged in vertically stacked relation, as shown in FIG. 5, the downwardly projecting annular ribs 51 of one disc project into the upwardly facing recesses 55 of the disc immediately below, and the upwardly projecting ribs 52 of a lower disc project into the downwardly facing recesses 54 of the disc above. Pursuant to the invention, the height of the ribs is substantially equal to the depth of the recesses, into which they project. The arrangement is such that, when discs are placed in axially stacked relation, the interfitting ribs and recesses form a series of annular passages 72-79 within the disc stack, substantially as shown in FIG. 5.

As reflected in FIGS. 3 and 4, the sets of annular ribs 51, 52 are provided with a series of radially aligned slots 61 (in the lower ribs 51) and 62 (in the upwardly projecting ribs 52). Although the angular spacing X of adjacent radial slots will vary as a function of the size of the valve and the pressures and flow volumes to be dealt with, a typical six inch valve for high pressure service may utilize an angular slot spacing of three degrees, providing for 120 equally spaced radial rows of slots. In general, and subject to the exceptions to be noted, the radial slotting of the discs will have the same spacing on opposite side. However, the slots on opposite sides of the discs advantageously are offset through an angle equal to one half of the spacing angle between adjacent radial rows of slots. Thus, in the illustrated example of a six inch valve utilizing trim plates having three degrees of angular spacing between rows of slots, the lower slots will be offset one and one half degrees from the upper slots. This can be seen from comparison of FIGS. 3 and 4. This arrangement is such that, when a pair of discs are assembled in axially stacked relation, with the slots 61 of the outermost rib 51 in vertical alignment, all of the downwardly facing slots 61 will be aligned along radius lines which lie between adjacent radius lines of the upwardly opening slots 62. In general, all of the slots extend radially through all of the ribs. Where desired, however, additional radial slots could be cut extending, for example, from the inside rib to an intermediate rib, so as to provide increased slot flow area in the inner portions of the stack.

In the assembled stack, fluid penetrating the stack through the outermost set of downwardly facing slots 61 enters the outermost annular chamber 79. Since the upwardly facing slots 62 are offset from the slots 61, the fluid cannot flow straight through in a radial direction, but it is impacted against the outermost rib 52 and divided and caused to flow circumferentially through the outermost annular passage 79, in both directions. After a short circumferential travel, the fluid reaches the next set of offset radial slots 52, where it combines with fluid flowing to the same slot from the other direction. The combined flows then pass radially through the offset slot into the next annular chamber 78.

As is apparent in FIG. 5, the fluid entering into the restrictor assembly is confined between vertically adjacent plates as it flows generally radially from the outside to the inside (or vice versa in some cases), repetitively dividing and recombining as the individual flows enter the annular passages, meet an unslotted area of the next baffle rib, divide and flow circumferentially to a slotted opening on either side, combine and flow through the next slotted opening, etc.

Pursuant to one aspect of the invention, the flow area provided by the respective slots 61, 62 is significantly less than the flow area provided by the annular flow chambers 72–79. Thus, in the representative six inch valve, the annular ribs 51, 52 may be provided with slots approximately 0.062 inch wide and 0.055 inch deep. Correspondingly, the annular flow passages 72–79 may have a depth of approximately 0.062 inch and a width of approximately 0.092 inch. In the representative valve indicated, the dimensions of the annular flow passages are achieved by providing for the annular recesses 54, 55 to be on the order of 0.235 inch in overall radial width, with a depth of 0.0622 inch. In the assembled stack, within each recess there is, of course, a rib of approximately 0.050 width, defining two chambers of approximately 0.092 inch width. The annular flow passages thus have a flow area around 60% greater than the flow area of the radial slots 61, 62. In addition, it will be understood that the annular chambers carry a flow volume which is approximately one half that of the radial slots, inasmuch as the flow stream is divided upon passing through a radial slot, with approximately one half of the flow going in one direction, and one half going in the other.

As reflected in FIG. 5, the radial slots 61, 62 need not extend for the full depth of the ribs 51, 52. Indeed, since the slots desirably are formed by a milling cutter or similar means arranged to form a row of slots across a full diameter of the disc, the slots desirably should terminate sufficiently above the bottoms of the recesses 54, 55 to avoid cutting into the bottoms of the recess area within the normal tolerance range of the machining operation. In a typical case, the slots 51, 52 will be cut quite close to the bottoms of the recesses (e.g. 0.055 inch deep in a rib of 0.062 inch height), although it will be understood that shallower slots may be utilized where desirable or appropriate.

In the representative six inch valve heretofore referred to, it may be appropriate to provide a total of about six annular ribs on the bottom of a disc plate and five on the upper surface. Such a representative valve may have an axial stack of approximately fifteen of such discs, including the uppermost and lowermost disc elements. In the specifically illustrated form of the valve, the upper and lower elements of the restrictor stack are shown to be formed by the balancing cylinder 34 and seat ring 20 respectively, with the lower surface 81 of the balancing cylinder and the upper surface 82 of the seat ring 20 being machined in the same manner as an upper surface of a disc 30a. In some cases, it may be preferable to form the entire restrictor stack of special discs, so that the balancing cylinder 34 and the seat ring 20 do not form an integral part of the restrictor assembly.

Because of the incremental nature of the restrictor stack (i.e., as the valve plug 40 is raised or lowered within the valve trim, restrictor passages are opened or closed in relatively discrete layers) it may be desirable to provide for a relatively smaller number of radial passages through the restrictor disc assembly in the lower strata, in order to provide for an improved ability to modulate in the nearly closed positions of the valve. In the representative six inch valve referred to above, it has been found advantageous to provide two levels of restrictor passages, in which the radial slots are spaced twelve degrees apart, to provide for thirty radial passages, rather than 120 radial passages as in the upper layers. In such a case, one of the discs will be slotted on its upper surface for 120 rows and on its lower surface for thirty rows.

Although it may be possible to assemble the restrictor stack and hold the elements thereof together by clamping force alone, it is generally desirable to secure the parts together by brazing. Typically, the several discs may be coated with brazing powder and then heated in a high temperature furnace to fuse the stack. The final machining of the stack is performed after the brazing operation.

Figure 9:
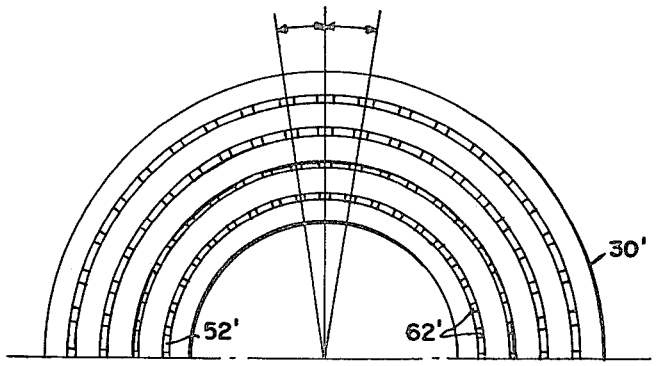
FIGS. 9 and 10 are top plan and bottom plan views respectively of the disc element of FIG. 8.
Figure 8:
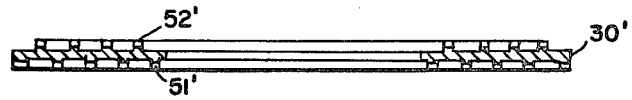
FIG. 8 is a cross sectional view of a disc element similar to that of FIG. 2, but modified for use in connection with a compressible fluid.
Figure 10:
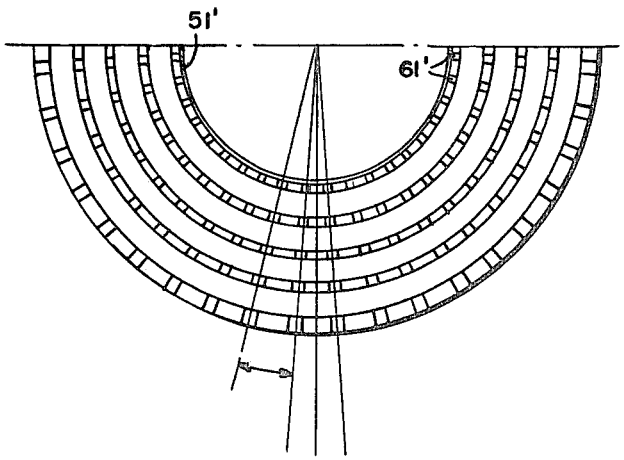

The modified form of restrictor disc illustrated in FIGS. 8–10 of the drawings, is in a form suitable for use in conjunction with compressible fluids, such as steam. In general, the construction of the valve for utilizing the modified restrictor disc is the same as that shown in FIG. 1, except that the illustrated valve is arranged for the flow of compressible fluid from the inside of the restrictor stack toward the outside. Since the incremental pressure drops of a compressible fluid will be accompanied by an increase in volume, it is desirable to progressively increase the size of the radial slots 61', 62' provided in the several rows of annular ribs 51', 52'. In the specific form of restrictor stack construction according to the invention, this may be readily accomplished by forming the radial rows of slots in two cuts, with the disc being rotated slightly between the first and second cuts. The width of the slots thus increases in proportion to the radius of the rib, accommodating expansion of the compressible fluid as it proceeds from the inside of the stack toward the outside. It may also be desirable in the disc modification of FIGS. 8–10 to progressively increase the radial spacing between adjacent annular ribs, from the inside to the outside of the disc, to provide for progressive enlargement of the annular flow passages, as well as the radial slots. In some cases, it may be preferred to arrange for the flow of compressible fluids from outside to inside, notwithstanding the need to provide for expansion of the fluid as it proceeds in a readially inward direction. This can be effectively accomplished by appropriate spacing and sizing of the disc ribs and slots, as will be understood. Likewise, valves used for incompressible fluid service may be arranged for inside-to-outside flow through the restrictor, although the reverse is preferred.

In any of the various modifications of the invention, the assembled disc stack is such as to provide for a relatively large plurality of individual, general radially progressing flow streams through the restrictor, with the flow streams alternately passing radially through a restricted orifice, then dividing and flowing circumferentially through an expansion chamber, then recombining and flowing radially through a restricted passage, etc. The combined effects of repetitive expansion and contraction, repetitive right angular changes of direction, and passage friction serve to effectively dissipate the high energy of the fluid, in dropping its pressure, to avoid excessive noise and cavitation effects. While the underlying principles of effecting pressure drop through multiple changes of direction, expansion and contraction, etc. are known, the particular valve structure of the present invention enables this to be achieved in a highly advantageous manner by providing for a series of annularly ribbed discs, which are machined to provide a series of radially aligned slots in the ribs. In an assembled stack, however, the ribs of one disc are interfitted with the ribs of an adjacent disc, so that a straight path from one radially aligned slot to another in a given disc is blocked by the interposition of an unslotted rib area from an adjacent disc.

Theoretically, the individual discs could be provided with slots which are aligned on the top and bottom, with adjacent discs being angularly offset from each other to provide for the desired offset of radial slots between adjacent discs. However, it is mechanically superior, from the standpoint of strength of the discs, to machine the individual discs such that the slots on one surface are offset from slots on the opposite surface.

The structure of the present invention, enables a disc-type restrictor stack to be provided, which has some of the functional characteristics of the Willmann U.S. Pat. No. 973,328 and/or the Hayner U.S. Pat. No. 3,688,800, while at the same time providing for a greatly simplified, mechanically superior valve structure. These important advantages are derived from a specific arrangement of ribbed discs, with mutually interfitting ribs and recesses in adjacent discs, and with the individual discs being provided with radially aligned slots offset from radially aligned slots of an adjacent disc.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A method for making a fluid flow restrictor for incorporation in a valve or the like, and of the type comprising a series of axially aligned and stacked discs, forming an annular restrictor and providing multiple fluid passages between the inside and outside to effect pressure drop and energy dissipation, comprising the steps of
    (a) forming a plurality of radially spaced, axially projecting baffle-forming annular ribs on opposite faces of each disc of several disc structures, wherein the radial thickness of each of said ribs is substantially less than the radial width of the recess formed between adjacent ribs, and the ribs and recesses are of substantially equal height,
    (b) forming said annular ribs on said several disc structures whereby the annular ribs on alternate ones of said several disc structures are arranged such that said disc structures are stackable one on another with the ribs on opposed faces of adjacent discs in the stack being offset in the assembled stack with the annular ribs of one disc structure being received in the annular recess of the other,
    (c) thereafter forming a plurality of radially aligned slots extending through successive ones of said annular ribs on each face of said disc structures,
    (d) arranging said disc structures in a fixed stack whereby the annular ribs of one face of one disc structure are received in the recesses between the offset annular ribs of the opposed face of an adjacent disc structure and contact said opposed face to define annular flow passages, and
    (e) orienting said disc structures in the stack whereby the radially aligned slots of the ribs on one side of a disc structure are offset from the radially aligned slots of the interfitting ribs of the adjacent disc structure to form a plurality of series-parallel flow paths between the inside and outside of the assembled disc stack.

2. The method of claim 1, further characterized by
    (a) the step of forming said ribs being carried out by a turning operation to form annular grooves in the surfaces of said disc structures.

3. The method of claim 1, further characterized by
    (a) the step of forming said radially aligned slots being carried out by a radial slotting operation.

4. The method according to claim 1, further characterized by
    (a) forming a first set of radially spaced, axially projecting annular ribs on one face of each of several disc structures,
    (b) forming a second set of radially spaced, axially projecting annular ribs on the opposite face of said several disc structures, wherein the ribs of said second set are radially offset from the ribs of said first set,
    (c) arranging said disc structures in a stack whereby the annular ribs of the first set of each of said disc structures are received in the recesses between the annular ribs of the second set on the opposed face of an adjacent disc structure to define annular flow passages.

* * * * *